United States Patent
Salomons et al.

(10) Patent No.: US 10,015,547 B2
(45) Date of Patent: Jul. 3, 2018

(54) METHOD AND APPARATUS FOR TV PROGRAM RECOMMENDATION BASED ON A DIFFERENCE OF INSTANTANEOUS RELEVANCY BETWEEN THE CURRENTLY WATCHED TV PROGRAM AND A PARTICULAR TV PROGRAM

(71) Applicant: Telefonaktiebolaget LM Ericsson (publ), Stockholm (SE)

(72) Inventors: Edwin Salomons, Dublin (IE); Rafal Borczuch, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/125,637

(22) PCT Filed: Mar. 17, 2014

(86) PCT No.: PCT/EP2014/055275
§ 371 (c)(1),
(2) Date: Sep. 13, 2016

(87) PCT Pub. No.: WO2015/139718
PCT Pub. Date: Sep. 24, 2015

(65) Prior Publication Data
US 2017/0013312 A1 Jan. 12, 2017

(51) Int. Cl.
*H04N 21/466* (2011.01)
*H04N 21/643* (2011.01)
*H04N 21/438* (2011.01)
*H04N 21/442* (2011.01)
*H04N 21/433* (2011.01)
*H04N 21/45* (2011.01)
*H04N 21/482* (2011.01)

(52) U.S. Cl.
CPC ..... *H04N 21/4668* (2013.01); *H04N 21/4331* (2013.01); *H04N 21/4383* (2013.01); *H04N 21/44222* (2013.01); *H04N 21/4532* (2013.01); *H04N 21/4667* (2013.01); *H04N 21/4826* (2013.01); *H04N 21/64322* (2013.01)

(58) Field of Classification Search
None
See application file for complete search history.

(56) References Cited

U.S. PATENT DOCUMENTS

| 2003/0066077 A1 | 4/2003 | Gutta et al. |
| 2004/0003395 A1 | 1/2004 | Srinivas et al. |

(Continued)

FOREIGN PATENT DOCUMENTS

| WO | WO 2004/091187 | 10/2004 |
| WO | WO 2013/046220 | 4/2013 |

OTHER PUBLICATIONS

International Search Report for International Application No. PCT/EP2014/055275—dated Jan. 8, 2015.

*Primary Examiner* — Hoang Vu A Nguyen Ba
(74) *Attorney, Agent, or Firm* — Baker Botts, LLP

(57) ABSTRACT

A method of assisting selection of a TV channel in a linear IPTV service where a prompt to switch a TV channel to another TV channel is generated based on measures indicative of instantaneous relevance of TV programs concurrently broadcast in a plurality of linear TV channels.

17 Claims, 6 Drawing Sheets

(56) References Cited

U.S. PATENT DOCUMENTS

2005/0081252 A1* 4/2005 Chefalas ............... H04N 7/163
                                                          725/135
2009/0055385 A1   2/2009 Jeon et al.
2010/0050200 A1   2/2010 Tsai et al.

* cited by examiner

Fig. 4
| Channel | Relevance |
|---|---|
| Channel 5 | 253 |
| Channel 1 | 241 |
| Channel 27 | 151 |
| Channel 3 | 28 |
400
Fig. 5
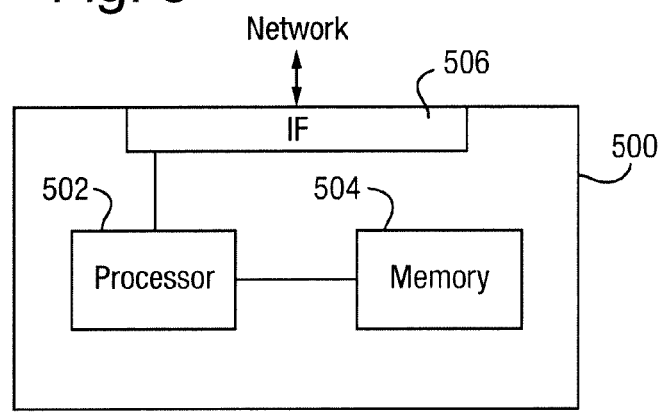
Fig. 6
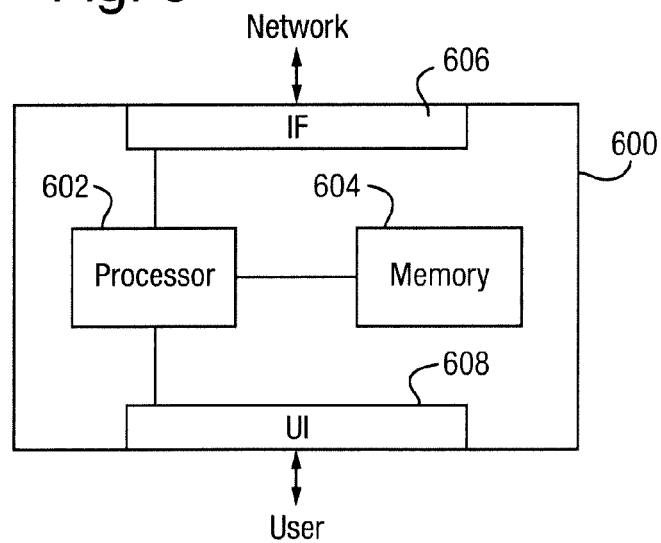

METHOD AND APPARATUS FOR TV PROGRAM RECOMMENDATION BASED ON A DIFFERENCE OF INSTANTANEOUS RELEVANCY BETWEEN THE CURRENTLY WATCHED TV PROGRAM AND A PARTICULAR TV PROGRAM

PRIORITY

This nonprovisional application is a U.S. National Stage Filing under 35 U.S.C. § 371 of International Patent Application Serial No. PCT/EP2014/055275, filed Mar. 17, 2014, and entitled "Method and Apparatus For TV Program Recommendation."

TECHNICAL FIELD

The present invention relates to IPTV, in general, and in particular to a method and an apparatus for providing recommendations to a user for a TV program or programs broadcast as linear TV programs.

BACKGROUND

Over the last decades, the steady increase in the available number of television channels has caused users to be overwhelmed by the amount of available linear TV content, especially delivered in Internet Protocol TV (IPTV) service. The term "linear TV" refers to TV service in which the viewer has to watch a TV program at the particular time the program is broadcast and on the specific channel it is presented on. Sometimes the term "live TV" is used with reference to the above discussed "linear TV". This increase made it hard to find TV content that would be relevant to the user amongst huge number of programs broadcast simultaneously. This results in random "channel surfing" behaviour where users scan for relevant content by hopping between different TV channels. The resulting user experience is inefficient (users will often miss interesting content) and therefore frustrating.

Existing audio-video content recommendation solutions focus mainly on on-demand content (e.g. NETFLIX or LOVEFILM), providing recommendations to the users; typically giving users the option to act on those recommendations, e.g. by clicking a recommended movie. Video services like YOUTUBE go one step further and construct personalized "channels" by concatenating recommended on-demand assets, operating without user intervention.

Companion services like www.zeebox.com offer simple analytics results for the popularity of linear TV content based on metrics like, for example, the number of tweets.

SUMMARY

It is the object of the present invention to provide an improved method and apparatus for producing recommendations of TV programs in linear TV in real time or near real time.

Accordingly, the invention seeks to preferably mitigate, alleviate or eliminate one or more of the disadvantages mentioned above singly or in any combination.

According to a first aspect of the present invention there is provided a method of assisting selection of a TV channel in a linear IPTV service. The method comprises monitoring control commands received by TV devices from users and determining measures indicative of instantaneous relevance of TV programs concurrently broadcast in a plurality of linear TV channels by analysing the control commands received by TV devices from users. The method further comprises delivering the determined measures as an input for generating of the prompt to select a TV channel based on the measures.

According to a second aspect of the present invention there is provided an apparatus for use in a network delivering TV channels in a linear IPTV service to TV devices. The apparatus comprises a processor and a memory, said memory contains instructions executable by said processor. Said apparatus is operative to monitor control commands received by TV devices from users and to determine measures indicative of instantaneous relevance of TV programs concurrently broadcast in a plurality of linear TV channels by analysing the control commands received by TV devices from users. Said apparatus is further operative to deliver the determined measures as an input for generating a prompt to select a TV channel based on the measures.

According to a third aspect of the present invention there is provided a TV device adapted to receive TV channels broadcast in a linear IPTV service. The TV device comprises a processor and a memory. Said memory contains instructions executable by said processor whereby said TV device is operative to receive a prompt to select a TV channel. Said prompt is generated based on measures indicative of instantaneous relevance of TV programs concurrently broadcast in a plurality of linear TV channels. Said measures are determined by analysing control commands received by TV devices from users.

According to a fourth aspect of the present invention there is provided a TV device adapted to receive TV channels broadcast in a linear IPTV service. The TV device comprises a processor and a memory, said memory contains instructions executable by said processor. Said TV device is operative to receive a set of measures indicative of instantaneous relevance of TV programs concurrently broadcast in a plurality of linear TV channels. Said measures are determined by analysing control commands received by TV devices from users. Said TV device is operative to generate a prompt to select a TV channel based on said measures.

According to a fifth aspect of the present invention there is provided an apparatus for use in a network delivering TV channels in a linear IPTV service to TV devices. The apparatus comprises a monitoring unit adapted to monitor control commands received by TV devices from users and a determining unit adapted to determine measures indicative of instantaneous relevance of TV programs concurrently broadcast in a plurality of linear TV channels by analysing the control commands received by TV devices from users. The apparatus further comprises a delivering unit adapted to deliver the determined measures as an input for generating a prompt to select a TV channel based on the measures.

According to a sixth aspect of the present invention there is provided a TV device adapted to receive TV channels broadcast in a linear IPTV service. The TV device comprises a prompt receiver operative to receive a prompt to select a TV channel, wherein said prompt is generated based on measures indicative of instantaneous relevance of TV programs concurrently broadcast in a plurality of linear TV channels. Said measures are determined by analysing control commands received by TV devices from users.

According to a seventh aspect of the present invention there is provided a TV device adapted to receive TV channels broadcast in a linear IPTV service. The TV device comprises a receiver operative to receive a set of measures indicative of instantaneous relevance of TV programs concurrently broadcast in a plurality of linear TV channels. Said measures are determined by analysing control commands received by TV devices from users. Said TV device further comprises a prompt generator operative to generate a prompt to select a TV channel based on said measures.

According to a eighth aspect of the present invention there is provided a network for delivering TV channels in a linear IPTV service comprising an apparatus as defined in the second or fifth aspects of the present invention.

Further features of the present invention are as claimed in the dependent claims.

The present invention provides the benefit of improved user experience by getting more relevant content to the user. More specific advantages of the invention are discussed in the detailed description section.

BRIEF DESCRIPTION OF THE DRAWINGS

The present invention will be understood and appreciated more fully from the following detailed description taken in conjunction with the drawings in which:

FIG. 4 illustrates a list of TV programs generated in accordance with one embodiment of the method of the present invention;

FIG. 5 is a diagram illustrating an apparatus for use in a network delivering TV channels in a linear IPTV service in one embodiment of the present invention;

FIG. 6 is a diagram illustrating a TV device adapted to receive TV channels broadcast in a linear IPTV service in one embodiment of the present invention;

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The invention in its various embodiments allows users to engage and disengage an auto-pilot mode for controlling live TV experience. While in this mode live TV channels may change automatically without user interaction via a remote control, intelligently guiding the user to relevant live TV content in real time. Depending on embodiment such an auto-pilot controlled live content can either be presented in the main video window or a small "real-time recommendation" PIP (picture-in-picture) window, which the user can conveniently toggle to the main-screen when desired or only a recommendation to change the TV channel may be displayed on a separate companion device. In this last embodiment automation of the switching is replaced with a recommendation to switch.

Preferably the invention introduces a suitable delay between live and viewed content such that the latency related to the processing of analytics data is hidden from the user. For instance, the system may start delayed playback on a channel broadcasting football match a short period of time before a goal based on analytics information obtained after the goal. Similarly, the system may tune away from a delayed version of a channel broadcasting a commercial break at the exact start time of the commercial break, based, on a change in analytics data obtained after the break.

Figure 1:
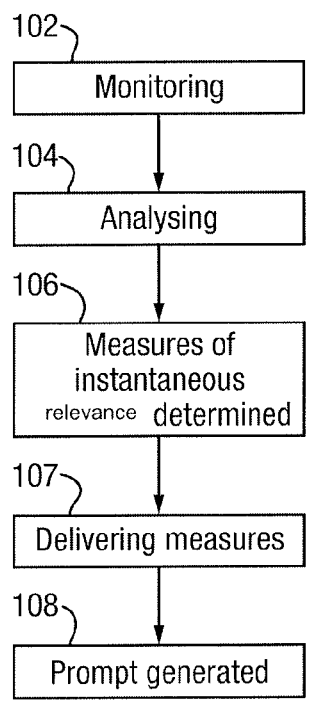
FIG. 1-FIG. 3 show flowcharts illustrating a method of assisting selection of a TV channel in various embodiments of the present invention.

With reference to FIG. 1 an embodiment of a method of assisting selection of a TV channel in a linear IPTV service is presented. Selection of a TV channel includes changing a channel from one currently watched to a different one, a recommendation to switch the channel as well as turning on a TV channel in a situation when a TV device was not switched on or was used for other functions (e.g. gaming or watching video-on-demand). The method comprises monitoring 102 control commands received by TV devices from users and determining 106 measures indicative of instantaneous relevance of TV programs concurrently broadcast in a plurality of linear TV channels. The audience watching TV programs delivered via IPTV services is large and large number of users watch the TV programs at the same time. The users control their TV devices by sending control commands using remote controls and by analysing these control commands it is possible to determine the measures indicative of instantaneous relevance of TV programs. Instantaneous means that the delay between the time when the measure indicative of relevance is determined and the time period it relates to is negligible from the point of view of viewing experience. The delay in determining the relevance measure is compensated by an optional delayed playback of the program described in embodiments of the present invention.

In linear TV programs are broadcast according to a schedule and once a program or its part is delivered the next opportunity to watch the program or its part will be at the next scheduled time, which may be anytime from minutes to days later. In some situations the value of the information contained in the program strongly depends on its novelty, for example a goal scored in a match, news in a TV bulletin, etc. In linear TV a plurality of TV programs are transmitted at the same time and selecting the most interesting, most valuable or, to put it simply, the most relevant to a particular user is difficult. In the case of movies, documentary films relevance of the TV program is relatively static, i.e. it does not change much over time, although some variation is possible. On the other hand sport events, news, reality TV shows have relevance that is very dynamic, a goal scored in football match, medal won at Olympic Games will increase relevance of this particular TV program. Therefore, relevance of TV programs broadcast in linear TV service changes over time and this is why instantaneous relevance is an important indicator for a user watching linear TV programs.

The measures indicative of instantaneous relevance are determined 106 by analysing 104 the control commands received by TV devices from users. Once the measures are determined, 106, the method comprises delivering 107 the determined measures as an input for generating 108 the prompt to select a TV channel based on said measures. In one embodiment the prompt is generated at the network side, preferably on the IPTV service provider side. In this embodiment the measures may be delivered 107 within the same device between different modules or different processes running in a processor 502 of the device 500, as shown in FIG. 5, which determines the measures and generates the prompt. Alternatively, the measures may be delivered 107 to TV devices (e.g. set-top-boxes, TVs with a IPTV module, home computer (desktop, laptop), tablet or smartphone running application for receiving IPTV service) of the individual users and the prompts may be generated locally in the users' TV devices. The prompt to select may take a form of a list of channels 400, as illustrated in FIG. 4, arranged in a descending order based on the measures indicative of instantaneous relevance associated with the TV channels or it may be a prompt to select the channel with highest measure indicative of instantaneous relevance.

In a preferred embodiment the measure indicative of instantaneous relevance of a TV program is a numerical value. An IPTV provider monitors commands that users send to their TV devices (set top boxes or other IPTV receivers). Each monitored command has a point value. For example, a user switching to a particular channel results in 1 point for the program broadcast on this channel. Here the parameter monitored is "switch to a particular channel" (S) command. To determine the measure of instantaneous relevance of a TV program in one embodiment a score is determined by counting all "switch to a particular channel" commands in a defined period of time. The period of time may be, for example, 1 minute. The shorter the time period the more instantaneous the measure is and the longer the time period is the more averaged the measure is. For example, if in the period of 1 minute 9658 users switch their TV devices to channel 4 then the measure indicative of instantaneous relevance of the TV program broadcast on channel 4 in this particular minute is M=9658. Other user commands and other factors may be included in determining the measures. Some of the commands or factors may be considered as more important than others and weight factors are used in the formula determining the measure. Preferably, the measure indicative of instantaneous relevance is determined periodically. Depending on the computing power the measure could be calculated with very short interval (e.g. in the range of milliseconds or even shorter). There will be some minimum interval, but preferably it will be reduced with increase of the computing power. In an alternative embodiment a scheduled determination of relevance may be implemented. In this embodiment, for example, the measure indicative of instantaneous relevance is determined twice five minutes after the program starts and twelve minutes after the program starts. If viewers stay tuned the program is good, if they drift away it means that it is not interesting. The measure is produced based on equation 1 or another alternative formula and the average of these two values may be used for the rest of the TV program.

Additional control commands or information derived from analysis of control commands that may be used in determining the measure of instantaneous relevance include the following. Possible ways of allocating points based on the commands or information are also suggested. However, many other schemes for allocating points can be envisaged.

Length of time a user stays on a TV channel ($T_{On\_channel}$). Clearly, if viewers do not drift away to other channels and stay long on the same channel it signifies that its relevance is relatively high. Minutes spent watching a channel may be converted into points.

Changing volume—number of changes of volume (V). Changing volume up +1 point, changing volume down −1 point.

Recording of a TV program (R). Number of users that record or start manual recording of a program while watching. The latter would catch programs that unexpectedly turn interesting.

Total number of users watching a TV channel (A).

Rate and direction of change of number of users watching a TV channel (dA/dt). If the number of users watching the program rapidly increases it signifies that the relevance of TV the program is high and it is higher than relevance of a TV program with growing number of viewers in which the growth of audience is slower. In turn, a rapid drop of number of users watching the program means that its relevance is lower than of another program whose audience drops slower.

If we consider the various factors discussed above that can be derived and analysed from commands the users send to their TV devices one embodiment of a formula for determining the measure of instantaneous relevance of a TV program is:

$$M=x_1*S+x_2*T_{On\_Channel}+x_3*V+x_4*R+x_5*A+x_6*(dA/dt) \quad (1)$$

Where $x_1$-$x_6$ are weights associated with the parameters discussed above. The more of these factors are considered the more accurate the determined measure will be. Of course this is just one example of a formula to determine the measure of instantaneous relevance and other formulas can equally be used.

There may be more factors that can be used in determining the measure. These factors may be considered independently (then a threshold may be set for individual factor crossing of which may cause generation of the prompt) or in combination with other factors discussed above. In this situation the value M defined in equation 1 triggers generation of the prompt if the value M crosses a threshold. Some of the additional factors are listed below:

Total number of users tuned to the channel. If considered on its own then it is checked against certain absolute or relative threshold.

Change in the number of users tuned to the channel exceeds a certain absolute or relative threshold.

Number of users tuning away from a specific channel in a period of time. If the number falls below a specific absolute or relative threshold it indicates increase of the relevance (i.e. users choose to stay focussed on the channel, for instance around when a goal is scored in a football match).

Number of tweets/messages per time unit about the content exceeds a threshold.

Historical viewing data for the user or specific demographic groups, e.g. the user or the user's peer group always watch X-factor and it starts now on channel 123.

In a preferred embodiment, in the step of determining the measures, 106, a rating provided in real time by a population of users during the program is taken into account.

In yet another embodiment of the present invention user tracking information is taken into account in the step of determining the measures indicative of instantaneous relevance. Preferably, the user tracking information is anonymised and all content from the information is removed. For example, if a user watches a football match transmission and a goal is scored then he/she may speak louder or even shout in excitement, however what the user said is not relevant and is not recorded in any way, what is tracked is the level of noise generated in the room. Similarly, tracking user's motion may be limited to detecting if the user sits in the front of the screen (which may suggest that the program is interesting) of if the user moves around the room or leaves the room (which may suggest that the program is not interesting or there is a commercial break). No video footage needs to be recorded and/or transmitted in order to achieve this. In some embodiments the user tracking information used in determining the measure may also be derived from other aspects of physical behaviour of users like eye tracking or detecting that a user is sitting forward, etc. When the population of users is large then this information may provide valid input for determining the relevance of a TV program. Assigning a weight to this information will keep it in balance with the other factors.

Figure 2:
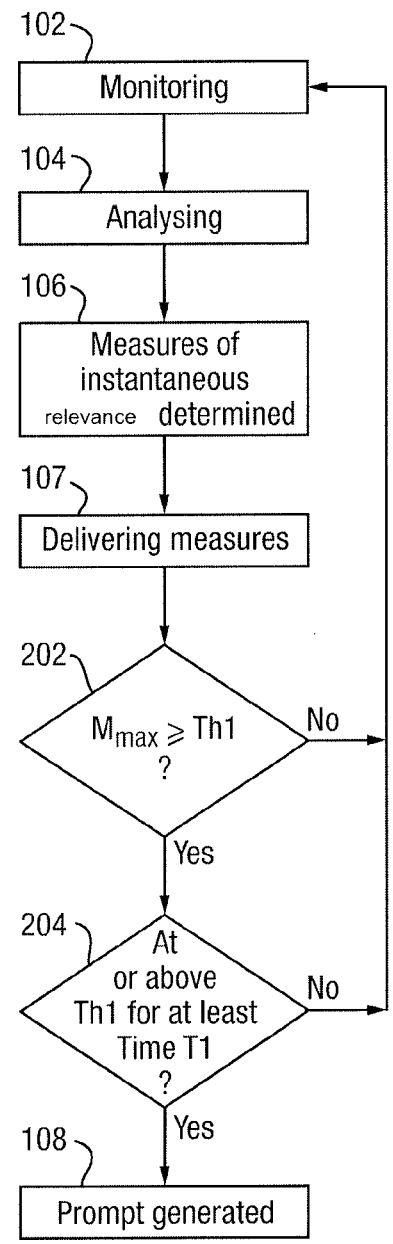

In a preferred embodiment, as illustrated in FIG. 2, the prompt is generated 108 if the highest measure $M_{Max}$ is equal or exceeds, 202, a first threshold, Th1. The advantage of this embodiment is that there always will be a program with a highest measure, but if all programs are not very interesting then this should not trigger generation of the prompt. In yet another alternative embodiment the prompt is generated only if the highest measure is for a channel other than the one being watched and the measure exceeds the first threshold.

In one embodiment the prompt may be presented to a user who tries to change a channel if he is trying to leave the channel currently having the highest measure indicative of instantaneous relevance that exceeds the threshold. In some cases users may be watching particular channel for too short period of time and inadvertently switch to channel that will be less interesting, this embodiment has the benefit of warning the users before drifting away from a relevant TV program.

Figure 3:
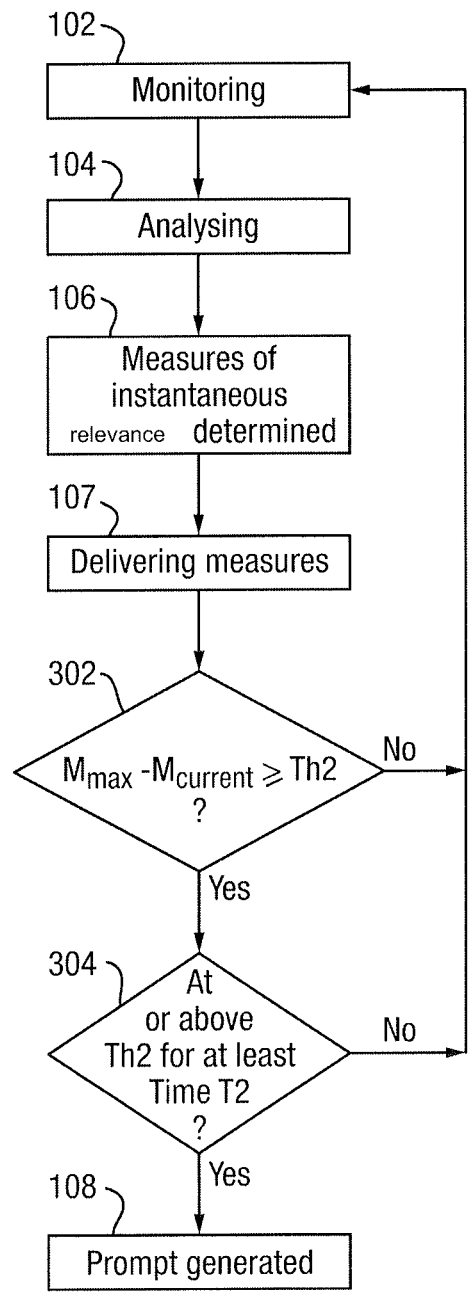

In another preferred embodiment illustrated in FIG. 3 the prompt is generated 108 if a difference between a first measure of instantaneous relevance of a TV program with the highest measure of instantaneous relevance $M_{Max}$ and a second measure of instantaneous relevance of the currently watched TV program $M_{Current}$ is equal or exceeds, 302, a second threshold, Th2. The advantage of this embodiment is that it allows detecting situations in which the current channel drops in relevance, e.g. due to a commercial break. The measure indicative of instantaneous relevance of a TV program fluctuates (e.g. due to the presence of commercial breaks) and the embodiment of the present invention prevents too frequent generation of prompts caused by these fluctuations. It can be said that this embodiment protects the user's choice of program and suggests change only when this is justified by significantly higher measure of instantaneous relevance of other TV programs.

Preferably, as illustrated in FIG. 2, the prompt is generated if the measure of instantaneous relevance of the currently watched TV program stays at or above the first threshold, Th1 for at least, 204, a defined period of time, T1. In the alternative embodiment illustrated in FIG. 3 the prompt is generated if the difference between a first measure of instantaneous relevance of a TV program with the highest measure indicative of instantaneous relevance and a second measure indicative of instantaneous relevance of the currently watched TV program stays at or above, 304, the second threshold Th2 for at least a defined period of time, T2.

$$M_{Max} - M_{Current} \geq Th2 \quad (2)$$

The advantage of these two alternative embodiments is that they prevent too frequent generation of the prompts caused by statistical fluctuation affecting the relevance. The operation of step 204 illustrated in FIG. 2 deals with temporary increase of relevance of a TV program other than the watched one whereas the operation of step 304 illustrated in FIG. 3 deals with both temporary increase of relevance of a TV program other than the watched one and temporary decrease of relevance of the watched TV program.

In addition to the objective and easily quantifiable factors discussed above in embodiments of the present invention other factors may also be taken into account in the step of determining the measure indicative of instantaneous relevance. In one embodiment in the step of determining the measures indicative of instantaneous relevance 106 a user profile is taken into account. In this way the measures, and in consequence the prompts, are tailored for individual user. After determining the measure using equation 1 or any other formula based on quantifiable factors the measure, in a preferred embodiment, is personalised for each individual user. For example, the user profile may include user preferences. These preferences may be defined by a user or may be determined based on statistics from historical data on the user's program choices. The user preferences may indicate that a particular user likes sport programs, action movies, specific actor, specific football club. For example, if the user defines in his preferences the following keywords: football (1.1), Manchester City (1.2) and action movies (1.1) then the relevance determined based on formula 1 or similar is multiplied by factors associated with the keywords—the factors are given above in the brackets. For example, if channel 1 broadcasts a football match from the Bundesliga the relevance determined by formula 1 will be multiplied by 1.1. If channel 2 broadcasts a football match in which one of the sides is Manchester City the relevance determined by formula 1 will be multiplied by 1.1*1.2=1.32 (this is a football match and it includes Manchester City, so the relevance is higher than for any other football match not involving Manchester City). Of course other multiplying factors can be envisaged. In different embodiments user's preferences may be recorded as a flat list, where all keywords have the same weight or as a ranked list where the keywords at the top weight more.

In an alternative embodiment only control commands from a population of users matching a specific characteristics are considered in the step of determining 106 the measures indicative of instantaneous relevance of TV programs. In this embodiment a certain characteristics from the user profile is used to filter a part of population of users watching the IPTV service. In this embodiment control commands from the population of users matching the characteristics is considered in determining the measures indicative of instantaneous relevance of TV programs. In one embodiment it will be users within specified age range and/or matching interests, etc. This embodiment prevents large population of viewers in the general population producing very high measure that cannot be later affected in generating personalised measure. For example, if on Saturday evening a large population of viewers watch a music contest the objective measure indicative of instantaneous relevance of this program will be very high and the measure of this program may still be the highest even after determining the personal measure for a user who prefers programs other than music contests. However, if the general population of users is first filtered based on the certain characteristics from the user profile then this domination of general population will be prevented.

Preferably the user preferences can be changed by the user to adjust the likely recommendation to particular needs or wishes of the user. For example the method of generating the prompts may be configured in a way that gives priority (higher weight) to specific information sources like experts, friends, general user base, specific demographics. Moreover the user may define a subset of channels to monitor, i.e. blacklist or whitelist. The user may change the threshold for generating the prompts, e.g. only disturb me for major events with measure above a certain threshold. The user may also decide and modify which of his/her social networks is to be used in determining the measure or decide on social network friends or groups to share watching patterns with .

Furthermore, in some embodiments the user profile may include his/her age. In these embodiments, in determining the measure of instantaneous relevance demographics of the users is analysed to filter only the part of the viewer's population that match the user's age. In calculating the value M in equation 1 only commands from this matching population are used. Alternatively or additionally the user profile may contain information about the user's gender and/or location.

Alternatively or in addition social network of the user is taken into account in determining the measure, i.e. only members of the user's social network are considered a population from which commands are used in calculating the value M in equation 1. Preferably, only part of a social network may be considered, for example family. Since the social network today includes not only people that personally know each other, but often includes celebrities or other people of special social status it is possible to base the relevance on recommendations from some specialists or TV content expert(s). This may be a team of professional TV content experts monitoring TV channels and signalling interesting events. Once the expert(s) are added as friends on Facebook or followed on Twitter they are part of the user's social network (although he may not know them in person) and their TV program recommendations may receive relevance boost. Of course, the link to the expert or experts recommending TV programs can be achieved via any other social network or via some special service, for example TV reviews provided in on-line versions of newspapers or magazines.

The embodiments discussed above allow for determining a measure indicative of instantaneous relevance of a TV program broadcast in live TV across large population of users, which is an objective measure based on the discussed earlier objective and easily quantifiable factors. The objective measure may be used as an input to determine a personalised measure indicative of instantaneous relevance of the same live TV program by applying subjective factors individual for each user based on the user's preferences, for example the various preferences defined in user profile. The advantage of this embodiment is live TV tailored for individual user.

In one embodiment the objective measures of the instantaneous relevance of the TV programs are delivered 107 to the TV devices 716-720 where the subjective (or personalised) measures are determined based on the users' profiles.

For an individual user the prompt is generated based on the locally determined subjective measures. In this embodiment the user profile including preferences is stored locally in the TV devices 716-720. In an alternative embodiment the users' profiles are stored remotely at the linear IPTV service provider side and the subjective measures are determined remotely, and the prompts are delivered to individual users.

Once the prompt is generated there may be different embodiments allowing for handling of the prompt. In one embodiment the generated 108 prompt is displayed as a picture-in-picture on a screen. In alternative embodiment the prompt is displayed on a companion device, which may be a mobile phone, tablet or a computer. The way the prompt is delivered to the companion device may also be different in different embodiments, it may be a text message (SMS) or an instant message received via one of many instant messenger applications, a message displayed by a specialist application. It may even be an email message, but this may be considered as slow compared to the other embodiments. In yet another embodiment the prompt may trigger automatic switch to the channel indicated by the prompt. This is the most invasive embodiment, but it may be beneficial in certain situations if the user does not want to delay the switching (e.g. switching to "second best" or another specific channel when a commercial break is detected). In alternative embodiments the system may work autonomously but the user has the ability to override it, e.g. by "locking" the current channel and disabling the prompts or by temporarily taking control, by changing to channels that were not necessarily recommended. Alternatively, the user controls the system, but the prompts are generated in exceptional circumstances, e.g. a major news event with high relevance measure for the user.

In a preferred embodiment the user, after switching on the TV device is greeted with a recommendations landing page, which is a start screen showing highlights of relevant channels (e.g. in PIP form) based on the determined measure.

Figure 8:
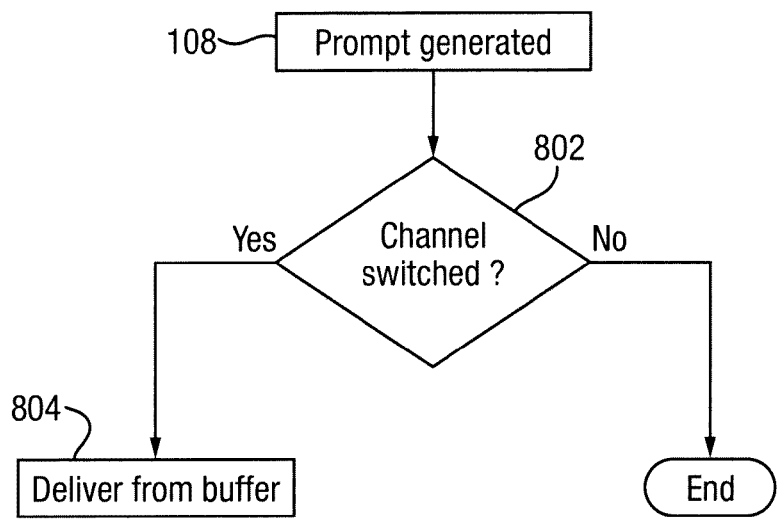
FIG. 8 shows flowchart illustrating delivering a TV program in one embodiment of the present invention.

In a preferred embodiment, as shown in FIG. 8, if the TV channel is switched 802 in response to the prompt the TV program broadcast on the TV channel indicated by the prompt is delivered to a TV device 716-720 from a buffer 740 with a delay 804. In a preferred embodiment the buffer 740 is located in the "cloud", which may be in a server farm that sits behind the access network through which the user accesses the IPTV service. In various embodiments the switch can be done automatically or initiated by the user in response to the prompt. Delivering the TV program with a delay has the advantage that the user can watch the part of the program that he or she would miss otherwise. If the measure of instantaneous relevance grew in response to a goal scored in a match then simple switching the channel to the one broadcasting the match would not allow watching the goal, but if the video stream is delivered from a buffer with a delay then the user can watch the action as it was originally presented. The delay must be long enough to include contents from before the increase in the measure indicative of the instantaneous relevance of the TV program. When there is a large population of viewers then the collected information shows, if analysed in time domain, when the measure indicative of instantaneous relevance started to increase. In a fast flowing sport a delay of tens of seconds should be enough to catch the action that led to the increase of the measure. In a slow flowing sport longer delay may be needed. The delay values may be manually set by the service provider or determined based on analysis of historical data for the same kind of sport.

In an alternative embodiment the delay introduced is long enough to include contents from the beginning of the program. The advantage of this embodiment is that it allows watching the program from the beginning with a relatively small delay rather than waiting for retransmission in the future. This embodiment is intended to cover a situation in which the user missed the beginning of a good movie or beginning of another program which scores high in the measure indicative of instantaneous relevance.

In yet another embodiment when accepting the prompt to switch the channel the user may be given options of how long delay should be applied in delivering the program to his/her TV device. The delay can range from 0 (no delay, acceptance of the prompt brings the user to the current position in the live broadcast) to "to the beginning of the program" with other values of the delay between these extremes.

In another embodiment by applying delay in delivering the program from the buffer 740 it is possible to remove commercial breaks and deliver the program to the TV device 716-720 with commercials removed.

For the comfort of use of the live (linear) TV service described in this disclosure the user may disable future prompts following acceptance of an earlier prompt. This way, if the user accepted a prompt and want to watch the selected program disabling future prompts will let him watch the program undisturbed.

Furthermore, for the comfort of use there may also be specific modes predefined for easy selection, like:
   Most watched—always switches to the most watched channel
   Most watched by demographics—most watched by people in my area or age group
   Best rated content—based on user provided real-time ratings (stars, thumbs up, etc.)
   Follow specific friends, e.g. my brother, my school class, a selected group of friends or the kids.
   Follow a specific person or group—e.g. watch what my favourite celebrity is watching.
   Follow a specific subject matter expert—e.g. let the New York Times TV critic control your TV.
   Auto pilot for specific genre only—e.g. select "news" to move to CNN if there is a sudden rise in viewing numbers.
   Random channel changes.
   Using personalised historical data about viewing habits.

With reference to FIG. 5 illustrating an apparatus 500 for use in a network delivering TV channels in a linear IPTV service to TV devices 716-720 is herein disclosed in one embodiment of the present invention. The apparatus 500 comprises a processor 502 and a memory 504, wherein said memory 504 contains instructions executable by said processor 502. In operation said apparatus 500 is operative to monitor control commands received by TV devices from users and determine measures indicative of instantaneous relevance of TV programs concurrently broadcast in a plurality of linear TV channels. The measure is determined by analysing the control commands received by TV devices 716-720 from users. Once the measures are determined they are delivered as an input for generating a prompt to select a TV channel based on the measures. In a preferred embodiment the apparatus 500 is operative to generate the prompt. The apparatus 500 communicates wih the network via interface 506. In a preferred embodiment the apparatus 500 is part of the server farm operating in the cloud. It receives from TV devices 716-720 data about received control commands and sends to said TV devices 716-720 the measures of the instantaneous relevance of the TV programs and/or the prompts.

In preferred embodiments the apparatus 500 is adapted to carry out the operations of to the method illustrated in FIGS. 1-3 and FIG. 8 and described above.

With reference to FIG. 6 illustrating a TV device 600, 716-720 adapted to receive TV channels broadcast in a linear IPTV service is herein disclosed. The TV device comprises a processor 602 and a memory 604. Said memory 604 contains instructions executable by said processor 602 and said TV device 600, 716-720 is operative to receive a prompt to select a TV channel. Said prompt is generated based on measures indicative of instantaneous relevance of TV programs concurrently broadcast in a plurality of linear TV channels wherein said measures are determined by analysing control commands received by TV devices 600, 716-720 from users. The TV device 600 communicates with the network via interface 606 and with the user via user interface 608 (e.g. screen, remote control).

In various embodiments the TV device may be a set-top-box or a TV with an IPTV module, a home computer (desktop, laptop), tablet or smartphone running application for receiving IPTV service.

In preferred embodiments the TV device is adapted to receive a prompt generated as explained in description of embodiments of the method discussed above.

Figure 7:
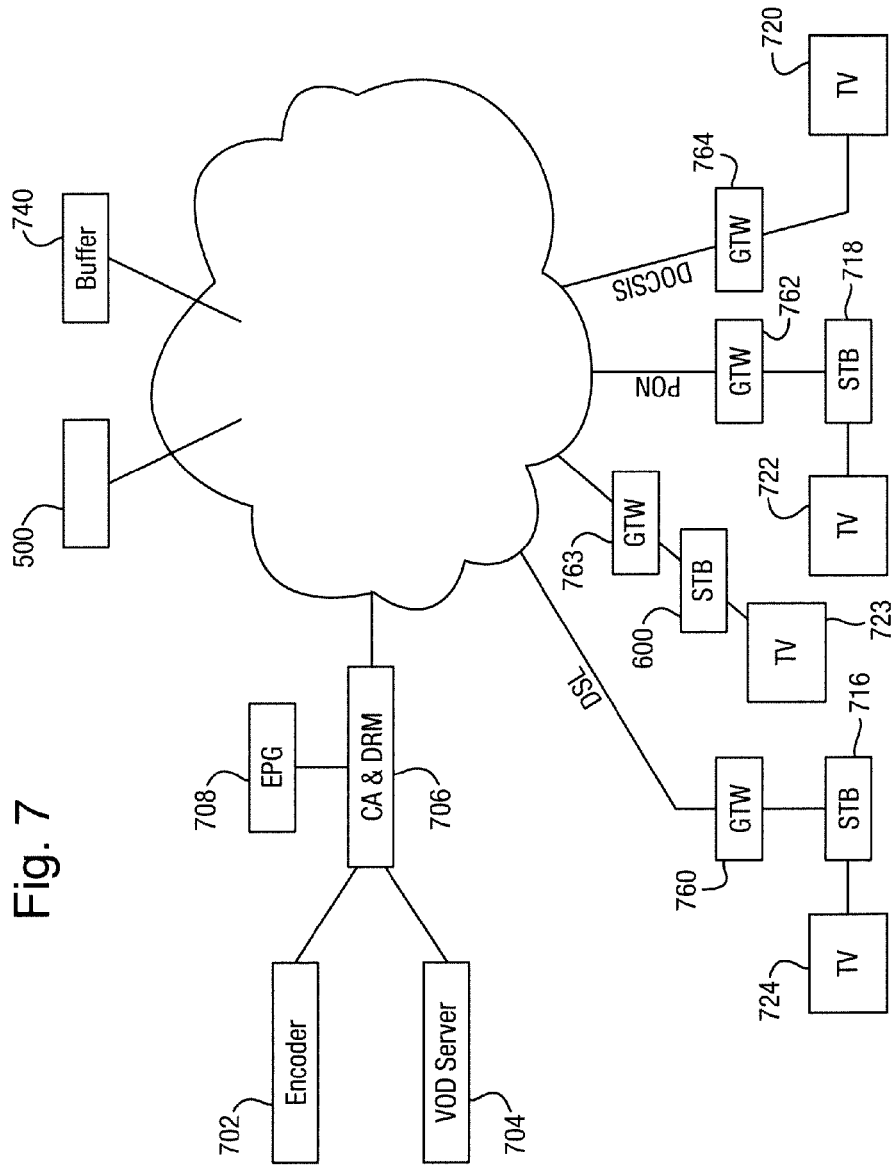
FIG. 7 is a diagram illustrating IPTV network adapted to deliver TV channels in a linear IPTV service in one embodiment of the present invention.

FIG. 7 illustrates a network 700 for delivering TV channels in a linear IPTV service comprising apparatus 500 and TV devices 600, 716-720. The network comprises an encoder 702 which receives TV signals and encodes these signals into packet video bitstreams for delivery to end users. When video-on-demand (VOD) services are offered a VOD server 704 sends packet video bitstreams for delivery to end users. The encoded TV and VOD signals are sent to CA & DRM (Conditional Access & Digital Rights Management) server 706 where Electronic Program Guide is added to the bitstream by an EPG server 708. EPG is preferably out of band for IPTV and in alternative embodiments TV devices 716-720 get EPG information from a separate EPG server. In a preferred embodiment the EPG server 708 may be in a server farm "in the cloud" which performs all control functions like support for metadata browsing, DRM access control, routing control, analytics, etc. The embodiment with EPG server and the other control functions implemented in the cloud is not illustrated. The bitstream is then transmitted and delivered over access lines (for example Digital Subscriber Line (xDSL), Passive Optical Network (PON), Data Over Cable Service Interface Specification (DOCSIS) or wireless access) to the end users. In a preferred embodiment the set-top-boxes and TV devices 720-724 are connected to these access lines via home gateways 760-764.

Figure 9:
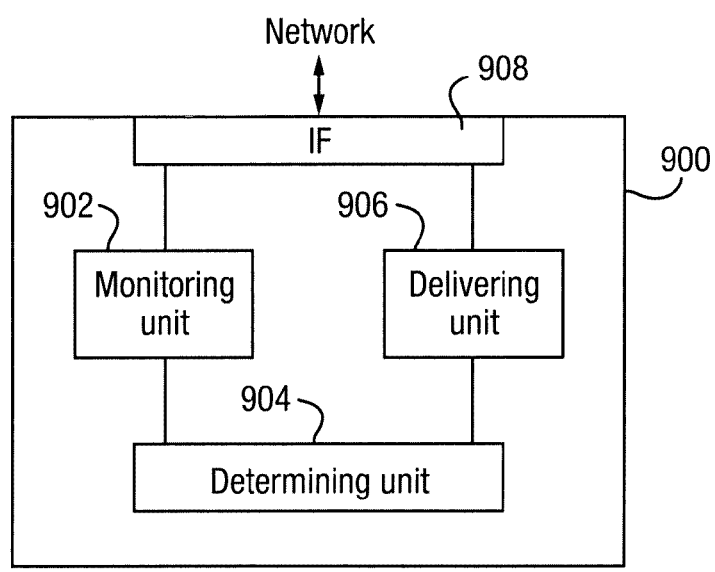
FIG. 9 is a diagram illustrating an apparatus for use in a network delivering TV channels in a linear IPTV service in one embodiment of the present invention.

With reference to FIG. 9 an alternative embodiment of an apparatus 900 for use in a network 700 delivering TV channels in a linear IPTV service to TV devices 716-720 is disclosed herein. The apparatus 900 comprises a monitoring unit 902 adapted to monitor control commands received by TV devices from users and a determining unit 904 adapted to determine measures indicative of instantaneous relevance of TV programs concurrently broadcast in a plurality of linear TV channels by analysing the control commands received by TV devices 716-720 from users. The apparatus 900 further comprises a delivering unit 906 adapted to deliver the determined measures as an input for generating a prompt to select a TV channel based on the measures. The units of the apparatus 900 may be implemented as a software units or modules, or, alternatively as dedicated hardware units configured to perform the functions described above. The apparatus 900 communicates wih the network via interface 1006.

Preferably the apparatus 900 is adapted to operate in accordance with the method described earlier.

Figure 10:
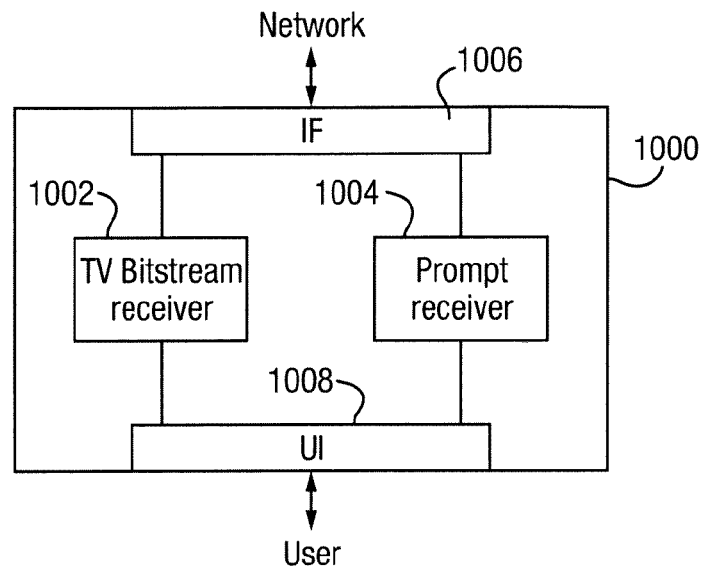
FIG. 10 and FIG. 11 are diagrams illustrating a TV device adapted to receive TV channels broadcast in a linear IPTV service in alternative embodiments of the present invention.

With reference to FIG. 10 an alternative embodiment of a TV device 1000 is described herein. The TV device 1000 comprises a TV bitstream receiver 1002 adapted to receive TV channels broadcast in a linear IPTV service. The device 1000 comprises a prompt receiver 1004 operative to receive a prompt to select a TV channel, wherein said prompt is generated based on measures indicative of instantaneous relevance of TV programs concurrently broadcast in a plurality of linear TV channels. Said measures are determined by analysing control commands received by TV devices from users. Preferably the prompt is displayed on a screen, which may be part of a user interface 1008 of the TV device 1000. The units of the TV device 1000 may be implemented as software units or modules, or, alternatively, as dedicated hardware units configured to perform the functions described above. The TV device 1000 communicates wih the network via interface 1006 and with the user via the user interface 1008.

Figure 11:
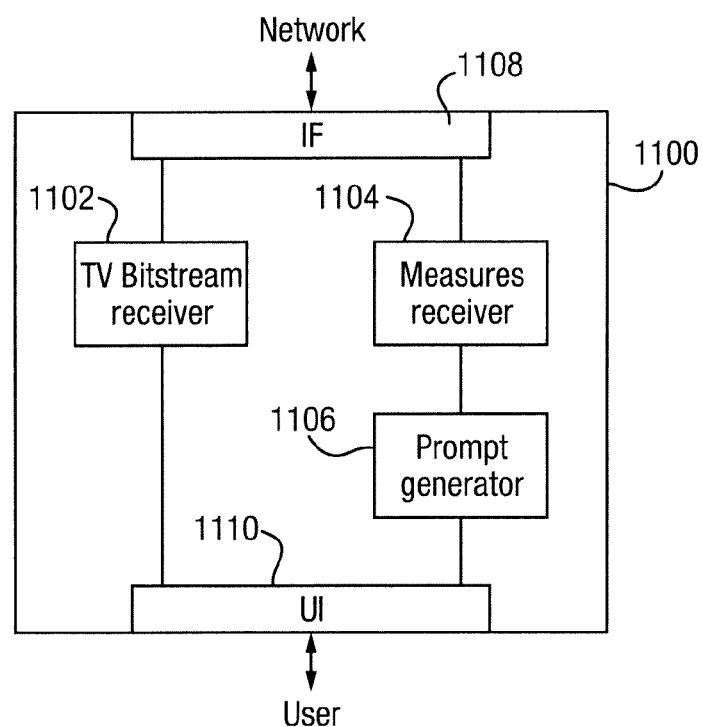

With reference to FIG. 11 an alternative embodiment of a TV device 1100 is described herein. The TV device 1100 comprises a TV bitstream receiver 1102 adapted to receive TV channels broadcast in a linear IPTV service. The TV device comprises a receiver 1104 operative to receive a set of measures indicative of instantaneous relevance of TV programs concurrently broadcast in a plurality of linear TV channels. Said measures are determined by analysing control commands received by TV devices from users. Said TV device 1100 further comprises a prompt generator 1106 operative to generate a prompt to select a TV channel based on said measures. The units of the TV device 1100 may be implemented as software units or modules, or, alternatively, as dedicated hardware units configured to perform the functions described above. The TV device 1100 communicates wih the network via interface 1108 and with the user via the user interface 1110.

The invention claimed is:

1. A method of assisting selection of a TV channel in a linear IPTV service comprising:
   monitoring control commands received by TV devices from users;
   determining measures indicative of instantaneous relevance of a plurality of TV programs concurrently broadcast in a plurality of linear TV channels by analyzing the control commands received by TV devices from users;
   determining that a difference between a first measure of instantaneous relevance of a particular TV program with a highest measure of instantaneous relevance and a second measure of instantaneous relevance of a TV program that a particular user is currently watching is equal to or exceeds a first threshold; and
   in response to determining that the difference between the first measure of instantaneous relevance and the second measure of instantaneous relevance is equal to or exceeds the first threshold, generating of a prompt to enable the particular user to change a TV channel associated with the TV program that the particular user is currently watching to the particular TV program with the highest measure of instantaneous relevance.

2. The method according to claim 1, wherein the information on the control commands includes at least one of the following:

length of time a user stays on a TV channel;
changing volume;
recording of a TV program;
total number of users watching a TV channel;
a rate and direction of change of number of users watching a TV channel.

3. The method according to claim 1, wherein in the step of determining the measures indicative of instantaneous relevance a user profile is taken into account.

4. The method according to claim 3, wherein the user profile includes at least one of age and social network.

5. The method according to claim 4, wherein the user profile includes user preferences.

6. The method according to claim 1, wherein at least one rating provided by a population of users is taken into account determining measures indicative of instantaneous relevance of the plurality of TV programs concurrently being broadcast.

7. The method according to claim 1, wherein in the step of determining measures indicative of instantaneous relevance user tracking information is taken into account.

8. The method according to claim 1 wherein if more than one factor is taken into account in the step of determining measures indicative of instantaneous relevance then the factors are given relative weights.

9. The method according to claim 1, wherein the prompt is generated when the difference between the first measure of instantaneous relevance of the particular TV program with the highest measure of instantaneous relevance and the second measure of instantaneous relevance of the currently watched TV program stays at or above the first threshold for at least a defined period of time.

10. The method according to claim 1, wherein the generated prompt is displayed as a picture-in-picture on a screen or on a companion device or the prompt triggers automatic switch to the channel indicated by the prompt.

11. The method according to claim 1, wherein, in response to the channel being switched to the particular TV program with the highest measure of instantaneous relevance as indicated by the prompt, the particular TV program is delivered to a TV device of the particular user from a buffer with a delay.

12. The method according to claim 11, wherein the TV program is delivered to the TV device with removed commercials.

13. The method according to claim 11, wherein the delay is long enough to include contents from before an increase in the measure indicative of the instantaneous relevance of the particular TV program.

14. The method according to claim 1, wherein the particular user disables future prompts following acceptance of a prompt.

15. The method according to claim 1 comprising generating the prompt to select the TV channel based on the received measures.

16. An apparatus for use in a network delivering TV channels in a linear IPTV service to TV devices, the apparatus comprising:
   a memory storing instructions; and
   a processor operable to execute the instructions to cause the apparatus to:
      monitor control commands received by TV devices from users;
      determine measures indicative of instantaneous relevance of a plurality of TV programs concurrently broadcast in a plurality of linear TV channels by analyzing the control commands received by TV devices from users;
determining that a difference between a first measure of instantaneous relevance of a particular TV program with a highest measure of instantaneous relevance and a second measure of instantaneous relevance of a TV program that a particular user is currently watching is equal to or exceeds a first threshold; and
in response to determining that the difference between the first measure of instantaneous relevance and the second measure of instantaneous relevance is equal to or exceeds the first threshold, generate a prompt to enable the particular user to change a TV channel associated with the TV program that the particular user is currently watching to the particular TV program with the highest measure of instantaneous relevance.

17. A TV device adapted to receive TV channels broadcast in a linear IPTV service, the TV device comprising:

a memory, storing instructions; and
a processor operable to execute the instructions to cause the TV device to:
  transmit, to a network device, control commands received from a particular of the TV device; and
  receive a prompt to allow the particular user to change a first TV channel associated with a first TV program that the particular user is currently watching to a second TV channel associated with a second TV program, wherein said prompt is generated when a difference between a first measure of instantaneous relevance of the first TV program and a second measure of instantaneous relevance of the second TV program is equal to or exceeds a first threshold, wherein the second measure of instantaneous relevance is determined by analyzing control commands received by a plurality of TV devices from a plurality of users.

* * * * *